(12) United States Patent
Eisen et al.

(10) Patent No.: US 8,737,620 B2
(45) Date of Patent: May 27, 2014

(54) SECURELY PROVIDING SECRET DATA FROM A SENDER TO A RECEIVER

(75) Inventors: Philip Allan Eisen, Ottawa (CA); Ettore Benedetti, Leiden (NL); Arnoud Evert Van Foreest, Leiden (NL); Andrew Augustine Wajs, Haarlem (NL)

(73) Assignee: Irdeto B.V., Hoofddorp (NL)

( * ) Notice: Subject to any disclaimer, the term of this patent is extended or adjusted under 35 U.S.C. 154(b) by 380 days.

(21) Appl. No.: 12/714,179

(22) Filed: Feb. 26, 2010

(65) Prior Publication Data

US 2010/0246822 A1 Sep. 30, 2010

(30) Foreign Application Priority Data

Mar. 2, 2009 (EP) .................................... 09154129
Feb. 19, 2010 (EP) .................................... 10154150

(51) Int. Cl.
*H04L 29/06* (2006.01)

(52) U.S. Cl.
USPC ............ 380/262; 360/259; 360/260; 360/261

(58) Field of Classification Search
USPC ................................................. 380/259–262
See application file for complete search history.

(56) References Cited

U.S. PATENT DOCUMENTS

| 7,110,548 | B1 | 9/2006 | Ougi et al. | |
| 7,155,611 | B2 | 12/2006 | Wajs et al. | 713/182 |
| 2003/0123665 | A1* | 7/2003 | Dunstan et al. | 380/255 |
| 2006/0184796 | A1* | 8/2006 | Fahrny | 713/176 |
| 2008/0044019 | A1 | 2/2008 | Junod | 380/228 |
| 2008/0101611 | A1* | 5/2008 | Lindholm et al. | 380/277 |
| 2008/0219643 | A1 | 9/2008 | Le Buhan et al. | 386/95 |

FOREIGN PATENT DOCUMENTS

| CN | 1984312 | 6/2007 |
| EP | 1035684 A2 | 9/2000 |

OTHER PUBLICATIONS

"European Application No. 09154129.2, European Search Report", (Apr. 28, 2009), 6 pgs.
Menezes, A. J., "Handbook of applied cryptography", (1997), 7 pgs.
Chinese Office Action issued in related application No. 201010161764.0, dated Oct. 25, 2013 (7 pgs).

* cited by examiner

*Primary Examiner* — Chau Le
*Assistant Examiner* — John Elmore
(74) *Attorney, Agent, or Firm* — Marc S. Kaufman; Reed Smith LLP (57) ABSTRACT

The invention provides a system and a method for securely providing a secret data from a sender to one or more receivers. The receiver uses a sequence of functions originating from a hierarchy of functions to migrate the secret data from an input transform space to an output transform space using a mathematical transformation under control of one or more seeds. The seeds are provided to the receiver by the sender. The sender conditionally allows the receiver to obtain the secret data by controlling the seeds.

15 Claims, 5 Drawing Sheets

SECURELY PROVIDING SECRET DATA FROM A SENDER TO A RECEIVER

CLAIM OF PRIORITY

The present patent application claims priority under 35 U.S.C. 119 to European Patent Application (EPO) No. 09154129.2 filed Mar. 2, 2009, and to European Patent Application (EPO) No. 10154150.6 filed Feb. 19, 2010, the entire contents of which are incorporated herein by reference.

FIELD OF THE INVENTION

The present invention relates to a system for securely providing a secret data from a sender to one or more receivers, a sender for securely providing a secret data to one or more receivers, a receiver for securely receiving a secret data from a sender, a method for securely providing a secret data from a sender to one or more receivers, a method in a sender for securely providing a secret data from the sender to one or more receivers and a method in a receiver for securely receiving a secret data from a sender.

BACKGROUND

Various encryption techniques are known for protected provisioning of data from a sender to a receiver, wherein the data is encrypted in the sender using an encryption key, the encrypted data is transmitted to the receiver and the encrypted data is decrypted in the receiver using a decryption key. The decryption key can be provided from the sender to the receiver as well, in which case the decryption key is secret data that needs to be securely provided. If the sender is in control of which receiver is able to obtain the secret data then the secret data is conditionally provided.

E.g. in a conditional access system for pay-tv, premium content is typically scrambled in a head-end system using a control word (CW) as encryption key. The scrambled content is broadcast to conditional access receivers. To allow a receiver to descramble the scrambled content, a smartcard is to be inserted into the receiver. Through the receiver the smartcard receives from the head-end system an encrypted entitlement management message (EMM) comprising a chipset session key (CSSK) encrypted under a key CSUK of the receiver. Through the receiver the smartcard further receives from the head-end system an entitlement control message (ECM) comprising the CW encrypted under the CSSK. Typically the CW has a shorter life time than the CSSK. Therefore the CSSK can be used to decrypt multiple CWs received in multiple ECMs over time. Using the decrypted CSSK the smartcard decrypts the CW, which can subsequently be used by the receiver to descramble the scrambled content. It is known that additional key layers may be used for decrypting the CW.

Manufacturing costs increase as the receiver is made more secure, because attackers develop new techniques over time to violate computing environments, and more sophisticated countermeasures need to be incorporated.

Especially in the pay-tv field, smartcards have been the platform of choice for providing a trusted environment to the receivers. However, though secure, smartcards are expensive both in terms of logistics—as they need to be distributed and tracked—and in terms of component costs. Moreover, as for any other hardware solution, it is difficult and costly to revoke and swap smartcards once deployed in case some flaw has been discovered. That implies that design and development of smartcard application needs to be very careful, and testing very thorough. Moreover, a smartcard does not provide sufficient CPU power to carry out bulk decryption of broadcast content. Therefore the role of the smartcard is mostly limited to relaying the obtained CW to more powerful hardware such as a descrambler in the receiver, either dedicated or general purpose. Such receiver—in turn—disadvantageously has to ensure a minimum degree of confidentiality when communicating to the smartcard, which entails some unique secret such as a key shared between the smartcard and the receiver.

There is a need for an improved solution for securely and conditionally providing secret data from a sender to a receiver.

SUMMARY OF THE INVENTION

It is an object of the invention to provide an improved method for securely providing secret data, such as e.g. a control word or a decryption key, from a sender to a receiver.

According to an aspect of the invention a system is proposed for securely providing a secret data from a sender to one or more receivers. The receiver comprises a first memory configured for storing a sequence of functions originating from a hierarchy of functions. Each function is configured to migrate the secret data from an input transform space to an output transform space using a mathematical transformation under control of a seed. The sender is configured to provide the seed to the receiver. The receiver is configured to migrate the secret data from the input transform space to a final output transform space using the sequence of functions under control of the seed.

According to an aspect of the invention a method is proposed for securely providing a secret data from a sender to one or more receivers. The receiver comprises a first memory configured for storing a sequence of functions originating from a hierarchy of functions, wherein each function is configured to migrate the secret data from an input transform space to an output transform space using a mathematical transformation under control of a seed. The method comprises the step of providing one or more seeds from the sender to the receiver. The method further comprises the step of migrating in the receiver the secret data from the input transform space to a final output transform space using the sequence of functions under control of the seeds.

According to an aspect of the invention a sender is proposed for securely providing a secret data to one or more receivers. The sender is for use in a system having one or more of the features as defined above. The sender is configured to define a hierarchy of functions. Each function is configured to migrate the secret data from an input transform space to an output transform space using a mathematical transformation under control of a seed. The sender is configured to provide the seed to the receiver.

According to an aspect of the invention a method in a sender is proposed for securely providing a secret data from the sender to one or more receivers. The method comprises the step of defining a hierarchy of functions, wherein each function is configured to migrate the secret data from an input transform space to an output transform space using a mathematical transformation under control of a seed. The method further comprises the step of providing one or more seeds to the receivers.

According to an aspect of the invention a receiver is proposed for securely receiving a secret data from a sender. The receiver is for use in a system having one or more of the features defined above. The receiver comprises a first memory configured for storing a sequence of functions originating from a hierarchy of functions. Each function is configured to migrate the secret data from an input transform space to an output transform space using a mathematical transformation under control of a seed. The receiver is configured to receive one or more seeds from the sender. The receiver is configured to migrate the secret data from the input transform space to a final output transform space using the sequence of functions under control of the seeds.

According to an aspect of the invention a method in a receiver is proposed for securely receiving a secret data from a sender. The receiver comprises a first memory configured for storing a sequence of functions originating from a hierarchy of functions, wherein each function is configured to migrate the secret data from an input transform space to an output transform space using a mathematical transformation under control of a seed. The method comprises the step of receiving one or more seeds from the sender. The method further comprises the step of migrating the secret data from the input transform space to a final output transform space using the sequence of functions under control of the seeds.

Thus, the secret data can advantageously be conditionally provided from the sender to the receiver without the need of specific hardware such as a smartcard at the receiver.

A transform (or transformation) is a particular data encoding, chosen to be lossless and not easily reversible to the original representation. Several classes of encodings are known, typically based on properties of certain algebras. A transform space is the domain defined by a particular transform that includes the encodings for all possible clear data, and where operations on the clear data are performed by mapped, equivalent operations on the encoded data.

"Under control of the seed" means that—in case the receiver is allowed to receive the secret data—the seed comprises specific data such as a value, a set of values or a function that matches with the input transform space of the secret data in such a way that the mathematical transformation performed by the function results in a meaningful output transform space of the secret data. In other words, the output transform space after transformation can be used as an input transform space in a subsequent transformation performed by a subsequent function under control of a corresponding seed such that the secret data would be obtainable when subsequently migrated to a clear text transform space. In case the receiver is not allowed to receive the secret data, the sender can either not send the seed resulting in the function being unable to perform the transformation or send an incorrect seed resulting in the function performing the mathematical transformation with a meaningless output. In the latter case the secret data cannot be obtained by migration to the clear text transform space.

A function is typically a software code portion or a software module stored in the memory. A processor executes the functions in the sequence of functions to migrate the secret data from the input transform space to the final output transform space.

The embodiments of claims 2 and 10 advantageously enable the sender to disable a group of receivers to obtain the secret data.

The embodiments of claims 3 and 11 advantageously enable the sender to disable a specific receiver to obtain the secret data.

The embodiments of claims 4 and 12 advantageously enable the secret data to be obtainable by a specific receiver only, i.e. the receiver that has the correct personalized seed which is typically unique to the receiver.

The embodiments of claims 5 and 13 advantageously enable protection against reverse engineering and/or reverse execution of the function, whereby the interfaces between the functions need not be protected.

The embodiments of claims 6 and 14 advantageously provide additional protection against reverse engineering of the functions.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
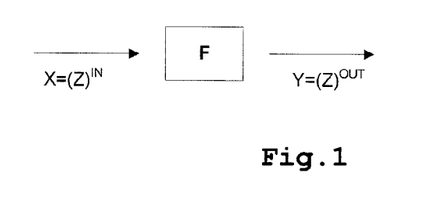
FIG. 1 shows a function performing a mathematical transformation of the prior art.

The function F shown in FIG. 1 is a mathematical operation that migrates data Z across two different transform spaces—e.g. encryption spaces—identified by IN and OUT. The dimension of the output transform space OUT is at least as large as the input transform space IN, and any data Z is represented (possibly not uniquely) in both input and output transform spaces as X and Y respectively. The transform spaces IN and OUT are defined in such a way that there is no apparent mapping between the data Z and its representation in either of the transform spaces, i.e. knowing only X and Y it is difficult or even impossible to obtain the corresponding Z. The function F is designed such that it is difficult to run in reverse direction. Because no apparent mapping between the input and output transform spaces exists and the dimension of transform spaces IN and OUT is preferably significantly large, recreation of the function F is prevented. Moreover, the function F is implemented in such a way that it is difficult to extract the data Z as it passes through the function, e.g. using known white box techniques and/or known code obfuscation techniques.

With reference to FIG. 1, function F is e.g. defined as $F(X)=3*X+2$. If the input transform space IN is a clear text transform space, then $X=(Z)^{IN}=Z$. After migration the following result is obtained: $Y=(Z)^{OUT}=3*X+2$. To migrate Z from the output transform space to the clear text transform space again, a reverse function $F^{-1}(Y)=(Y-2)/3$ must be available in the receiver to obtain X as follows: $F^{-1}(Y)=(3*X+2-2)/3=X$. In this example Z, X and Y are a numbers that can be used to transform using simple addition and subtraction mathematics. It will be understood that Z, X and Y can be data in any data format, including binary values, numbers, characters, words, and etcetera. The function F can be a more complex function and suitable for operation on e.g. binary values, numbers, characters or words. Function F is e.g. an encryption function.

Figure 2:
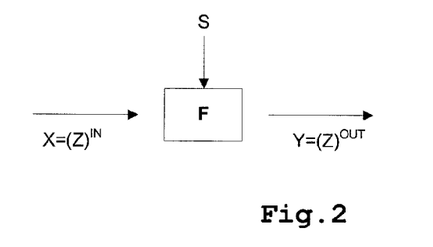
FIG. 2 shows a function performing a mathematical transformation under control of a seed of an exemplary embodiment of the invention.

The function F can be defined as a mathematical operation that can be seeded with an additional parameter (also referred to as "seed") S, as shown in FIG. 2. The migration that the function F performs is typically defined by the seed S only and no information about the input space IN and output space OUT is embedded into F. The function F is chosen in such a way that manipulation of input data X or seed S yields an unpredictable resulting data Y in the output transform space. The seed S does not need to be stored in a secure environment as the seed S is engineered in such a way that no information about transform space IN or OUT can be extracted.

With reference to FIG. 2, function F is e.g. defined as $F(X,S)=X-7+S$. If the input transform space IN is a clear text transform space, then $X=(Z)^{IN}=Z$. After migration the following result is thus obtained: $Y=(Z)^{OUT}=X-7+S=Z-7+S$. If e.g. a seed S is provided as data comprising the value of 5, then $F(X,5)=X-7+5$ and $Y=(Z)^{OUT}=X-7+5=Z-2$. To migrate Z from the output transform space to the clear text transform space again, a reverse function $F^{-1}(Y,S)=Y+7-S$ must be available in the receiver to enable the receiver to obtain Z as follows: $F^{-1}(Y,S)=(X-7+5)+7-S$. If the seed $S=5$ is known in the receiver, then Z can correctly be obtained as: $F^{-1}(Y,5)=(X-7+5)+7-5=X=Z$. If the input transform space IN is not a clear text transform space, then function F typically first performs a reverse transformation in the input transform space IN and next a transformation in the output transform space OUT. Such function F is e.g. defined as $F(X,S1,S2)=F_2(F_1^{-1}(X,S1),S2)$, wherein $F_1^{-1}(X,S1)=X-2-S1$ and $F_2(X,S2)=X-7+S2$. After migration the following result is thus obtained: $Y=(Z)^{OUT}=(X-2-S1)-7+S2=X-9-<S1,S2>$, wherein $X=(Z)^{IN}$. Seeds S1 and S2 can be provided as two separate seeds to first perform $F_1^{-1}(X,S1)$ and next perform $F_2(X,S2)$, or as a single seed comprising a compound <S1, S2> that can be used as input to $F_2(F_1^{-1}(X,S1),S2)$. If e.g. $S1=5$ and $S2=7$, then the compound must equal $<S1,S2>=5-7=-2$ to successfully migrate Z to the output transform space OUT. In these examples Z, X, Y and S are numbers that can be used to transform using simple addition and subtraction mathematics. It will be understood that Z, X, Y and S can be data in any data format, including binary values, numbers, characters, words, and etcetera. The function F can be a more complex function and suitable for operation on e.g. binary values, numbers, characters or words. Function F is e.g. an encryption function.

Figure 3:
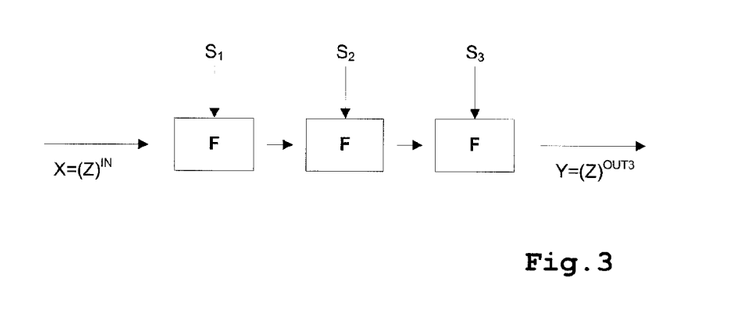
FIG. 3 shows a sequence of functions of an exemplary embodiment of the invention.

As shown in FIG. 3, the function F can be repeated multiple times in sequence, each time with a different seed (or compounds of) Si, to allow data Z to be migrated across multiple transform spaces. In the example of FIG. 3 the data Z is first migrated from the input transform space IN (i.e. $X=(Z)^{IN}$) to output transform space OUT1 (not shown) using function F and seed S1. The intermediate result $(Z)^{OUT1}$ (not shown) is then input to the function F with seed S2 to migrate the data Z from transform space OUT1 to transform space OUT2 (not shown). Finally, the intermediate result $(Z)^{OUT2}$ (not shown) is input to the function F with seed S3 to migrate the data Z from transform space OUT2 to transform space OUT3 resulting in $Y=(Z)^{OUT3}$. The total transformation from IN to OUT3 is fully dependent on all three seeds having correct the values in the correct order. The seeds have no meaning if used in isolation.

Figure 4:
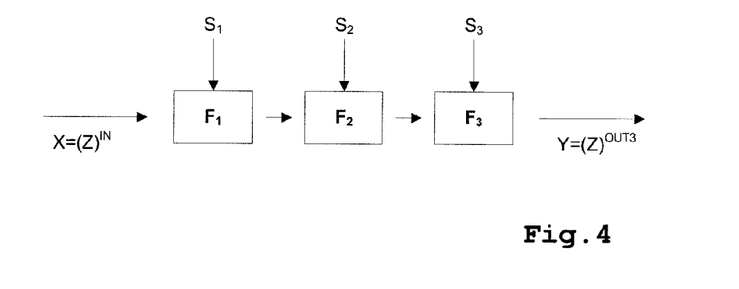
FIG. 4 shows a sequence of functions of an exemplary embodiment of the invention.

To prevent reverse engineering of function F, information about intra-stage transform spaces (OUT1 and OUT2 in the example of FIG. 3) may be partially embedded into the relevant functions, thus creating a new sequence of non-interchangeable functions Fi based on the same principles as explained for FIG. 3. This is shown in FIG. 4. In FIG. 4, each of the functions F1, F2 and F3, and its corresponding seed S1, S2 and S3, produces meaningful output only if its input transform space matches the output transform space of the previous function in the sequence. In the example of FIG. 4 the seed S1 in conjunction with function F1 migrates data Z from the input transform space IN to the output transform space OUT1, thus requiring the subsequently seed S2 in conjunction with function F2 to be capable of migrating data Z from an input transform space equal to OUT1. Similar to S1 in conjunction with F1, S2 in conjunction with F2 and S3 in conjunction with F3 are capable of migrating data Z from transform space OUT1 to transform space OUT2 and from transform space OUT2 to transform space OUT3, respectively.

The seeds Si are preferably chosen such that the data $Y=(Z)^{OUT3}$ is only meaningful to a specific receiver, wherein Y is processed by a piece of hardware that is uniquely personalized and thereby capable of obtaining Z from $Y=(Z)^{OUT3}$.

Figure 5:
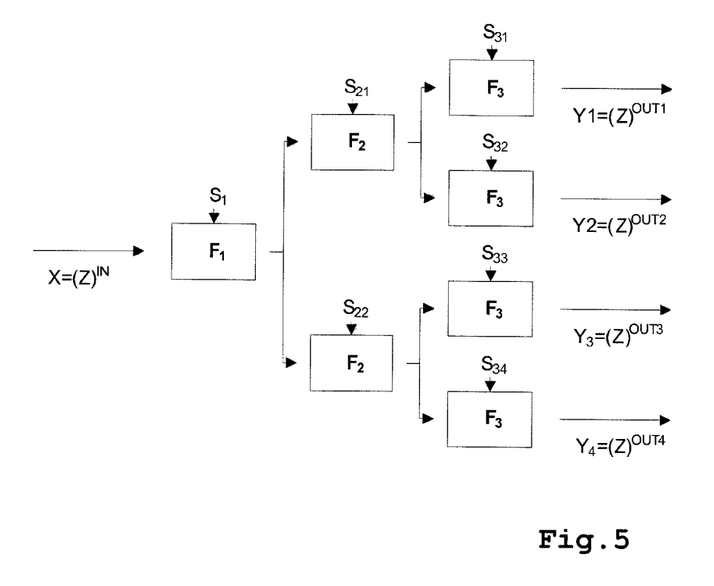
FIG. 5 shows a transformation hierarchy of an exemplary embodiment of the invention.

As shown in FIG. 5, a transformation hierarchy—i.e. a tree or hierarchy of n levels of functions F1 . . . Fn—can be defined with individual seeds Si for each function. In general a transformation hierarchy has at least two levels of functions (e.g. the functions F1 and F2 of FIG. 5). In theory the maximum number of levels is indefinite, but in practise the maximum number of levels is restricted by memory constrains for storing the transformation hierarchy or relevant part of the transformation hierarchy. The transformation hierarchy is used to transform a global transformed secret $X=(Z)^{IN}$ into a multitude of independent transform spaces. Typically a first transformation is performed in the sender to migrate the secret data Z from a clear text input transform space IN to an output transform space OUT. In the example of FIG. 5 the number of levels is 3 resulting in three different functions F1, F2 and F3 being used in the transformation hierarchy. The transformation hierarchy is used to conditionally migrate the global transformed secret X to final and possibly unique transform spaces OUT1 . . . OUT4, without exposing the secret data Z in a meaningful way.

With reference to FIG. 2, the function F can be chosen such that, for a given seed S* instead of S, it correctly transforms only a specific subset of data X from the input transform space IN to the output transform space OUT. The characteristics of the subset are determined by the mathematical operation that F performs, whereby the outcome of the transformation is dependent on the correlation between the data X and the data of the seed S*. In this case, the dimension of the output space OUT may result to be smaller than the input space IN. The seed S* which is used to conditionally migrate Z from transform space IN to transform space OUT, can be seen as an augmented version on the plain seed S which is used to unconditionally migrate Z from transform space IN to transform space OUT. The function F is chosen in such a way that it is difficult to deduce the resulting subset from a given data X and seed S*, and it is difficult to manipulate the subset by manipulating X and/or S* in order to include a specific data of X without affecting the resulting data Y in the output transform space. A correct seed S* correlates to the input transform space IN such that the mathematical operation performed by F yields the correct output transform space OUT. This technique is used to perform obscured conditional transformations that can be implemented using e.g. white box techniques or code obfuscation. The technique can be applied to any secret data Z.

Figure 6:
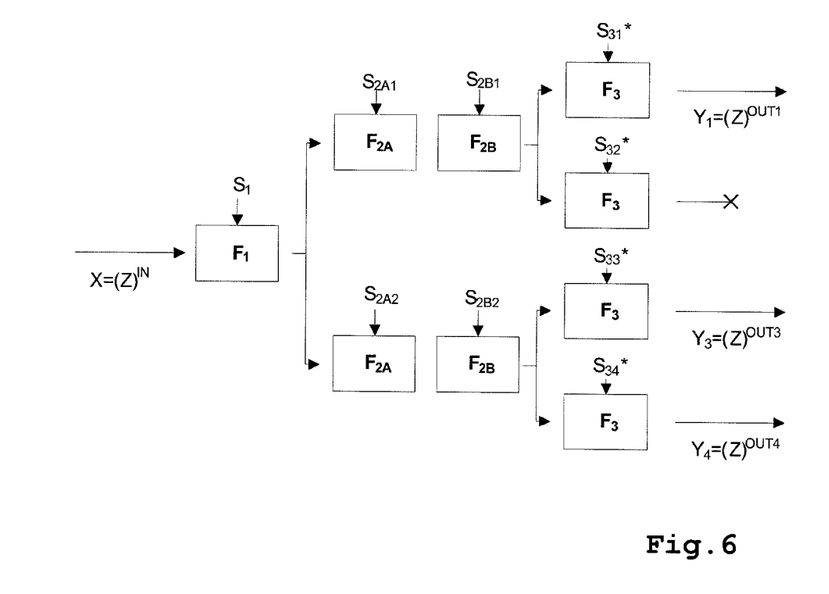
FIG. 6 shows a transformation hierarchy of an exemplary embodiment of the invention.

The conditional property of an augmented transformation function F allows an individual receiver, or group of receivers, to be revoked from obtaining the transformed control word Y, by choosing new seeds Si* at the lowest level (i.e. closest to the Y1 . . . Y4, in FIG. 6 this is the level of functions F3) of the transformation hierarchy. An example of a transformation hierarchy with augmented transformation functions F is shown in FIG. 6. Unlike traditional key hierarchy schemes wherein the valence equals 2, the valence of the bottom nodes can be made significantly larger than 2. Consequently, receiver revocation can take place more efficiently. For sake of simplicity, in the transformation hierarchy of FIG. 6 the valence is equal to 2.

In the example of FIG. 6, to revoke access of a specific receiver to $Y2=(Z)^{OUT2}$—indicated by "X" in-between Y1 and Y3—a new seed S2B1 can be provided in such a way that the resulting output space of F2B matches the input space of F3 only if seeded with the seed S31*. Herein S31* is specifically chosen to correlate with the F2 output space. The output space of F2B has now become useless when seeded with S32*. To prevent the revoked receiver from blocking any seed update, seeds S, S2A1 and S2A2 can be renewed too.

The functions F1 . . . Fn can differ from each other by relying on a different correlations between its input data X and seed S.

The invention advantageously enables globally transformed secrets X to be conditionally delivered and made available to a receiver in a preferably uniquely transformed form Y1 . . . Y4 without the need to deliver these data to each receiver individually. The migration of said secrets to final transform space OUT1 . . . OUT4 is done in a number of steps—each with their own seed Si or Si*—yet the individual steps, seeds and intermediate data are not meaningful in isolation. As long as the transformed data Y1 . . . Y4 is not meaningful outside the context of a specific receiver—e.g. it must match the input transform space of a uniquely personalized secure chipset in order to be able to obtain Z, whereby the secure chipset is difficult to copy—distributing this data Y1 . . . Y4 to other receivers is meaningless as the other receivers cannot obtain Z from Y1 . . . Y4. This provides protection against sharing and cloning the secret data Z, while keeping the resource requirements associated with white-box cryptography or code obfuscation within the receiver to a minimum. Only minimal hardware support is required in a receiver to be able to interpret the output transform space OUT1 . . . OUT4 of the conditional transform hierarchy and obtain Z.

The seeds Si and Si* are typically provided as dynamic data and can be cycled in time. Only specific seeds Si or Si* need to be updated and delivered to the appropriate receivers to manipulate conditional access to secret data Z. This provides bandwidth benefits.

The transformation hierarchy such as shown in FIG. 6 is typically defined or known in the sender. The sender generates the seeds S or S* and transmits the seeds to the relevant receivers. Hereby the seeds are generated such to enable or disable a specific receiver or a group of receivers, depending on the level of the functions whereto the seeds are applied, to transform X into Y. Moreover, the sender migrates the secret data Z from a clear text input transform space IN to an output transform space OUT using function F1 under control of seed S1. Each receiver is typically configured to transform X to Y along a predefined path of the transform hierarchy and subsequently derive Z from Y. Hereto typically a single path of functions is stored in a first memory of the receiver. It is possible to have multiple paths stored in the receiver to be able to obtain Z along different paths depending on the seeds received, e.g. to allow the sender to control access to different secret data Z. Several receivers can have the same path of functions Fi implemented or each receiver can have a unique path of functions Fi implemented. Referring to FIG. 6, Y1 . . . Y4 are e.g. data targeted at four different receivers. The first receiver is configured to transform X into Y1 along the path F2A(S2A1)-F2B(S2B1)-F3(S31*), the second receiver is configured to transform X into Y2 along the path F2A(S2A1)-F2B(S2B1)-F3(S32*), the third receiver is configured to transform X into Y3 along the path F2A(S2A2)-F2B(S2B2)-F3(S32*) and the fourth receiver is configured to transform X into Y4 along the path F2A(S2A2)-F2B(S2B2)-F3(S33*). The secret data Z is finally obtained by the receiver by migrating the data Z from the final output transform space OUT1, OUT2, OUT3 or OUT4 to a clear text transform space under control of a personalized seed stored in a second memory in the receiver. The first memory where the sequence of functions is stored and the second memory for storing the personalized seed can be parts of a single memory module or separate memory modules. In the clear text transform space the data Z is no longer transformed and thus usable by the receiver.

One or more of the transform functions Fi in the transformation hierarchy can be modified or replaced by uploading a new function F from the sender to one or more of the receivers in order to thwart reverse engineering of the transformation functions within the receiver.

In the receiver the invention is typically implemented at least partly as software or as a field-programmable gate array (FPGA) program in a programmable array. The implementation can reside in an unprotected, partially protected or secure memory of a processor. The processor executes the functions stored in the memory to migrate the secret data Z from the input transform space IN to the output transform space OUT. Minimal hardware support is required in the receiver. Limited bandwidth is required between the sender and the receivers and no return path is needed from the receivers to the sender. The secret data Z cannot be extracted or intercepted and thus cannot be illegally distributed to other receivers.

As explained above, the invention can be used to provide any kind of secret data Z from any kind of data sender to any kind of data receivers. An example application of the invention is conditionally providing keys or control words from a head-end system to conditional access receivers in a broadcast network. Pay TV applications in the broadcast network rely on the encryption of content data streams. Conditional access receivers need the relevant control words to decrypt the stream prior to decoding.

Figure 7:
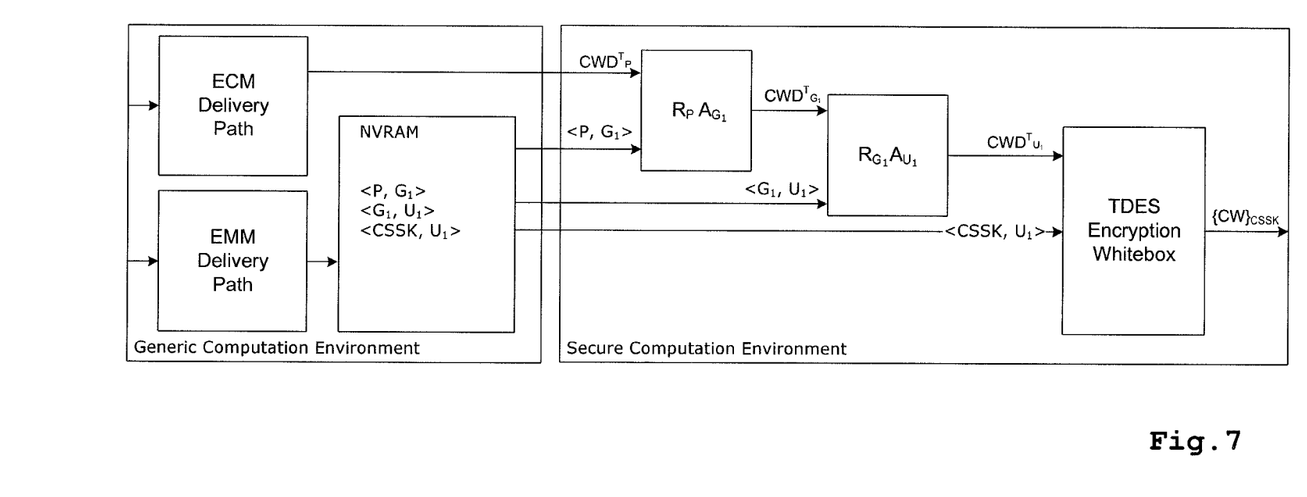
FIG. 7 shows a conditional access receiver of an exemplary embodiment of the invention.

FIG. 7 shows an example of a path of the transformation hierarchy implemented in a conditional access receiver. The receiver receives a control word CW as a globally transformed control word $CWD^{T}_{P}$ in an entitlement control message ECM. The receiver migrates the CWD from the input transform space P into the final output transform space CSSK of the receiver in three steps. The last migration step creates the transformed control word {CW}CSSK, which is the control word CW in the output transform space of the cluster shared secret key CSSK unique to the receiver. The conditional access receiver of FIG. 7 comprises a generic computation environment and a secure computation environment.

The generic computation environment comprises an ECM Delivery Path for receiving the ECM from the head-end system. The generic computation environment further comprises an EMM Delivery Path for receiving an Entitlement Management Messages (EMM) from the head-end system. The EMM comprises the seeds that are needed to migrate the CW through the transform spaces along the path of the transformation hierarchy. The seeds received in the EMM are stored in a NVRAM memory of the generic computation environment. A first seed equals the compound <P,G1>. A second seed equals the compound <G1,U1>. A third seed equals the compound <CSSK,U1>.

The secure computation environment comprises a sequence of functions. A first function $R_P A_{G1}$ transforms $CWD^T_P$ from the input transform space P to the output transform space G1 using the compound <P,G1> as seed input. Subsequently a second function $R_{G1} A_{U1}$ transforms $CWD^T_{G1}$, i.e. the CW in the transform space G1, from the input transform space G1 to the output transform space U1 using the compound <G1,U1>. Subsequently a third function, in this example a TDES Whitebox Encryption function, transforms $CWD^T_{U1}$, i.e. the CW in the transform space U1, from the input transform space U1 to the output transform space CSSK. The resulting {CW}CSSK is the CW encrypted under the CSSK key, which can be decrypted by the conditional access receiver using the CSSK that is pre-stored in a secured memory or securely derivable by the receiver.

Figure 8:
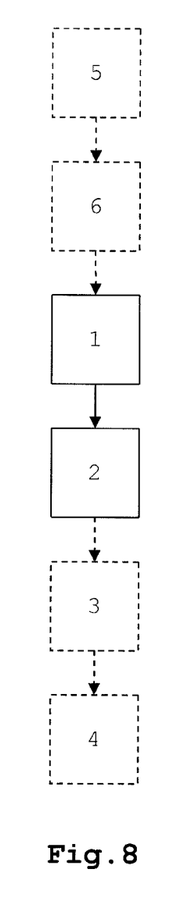
FIG. 8 shows the steps of a method in a system of an exemplary embodiment of the invention.

FIG. 8 shows the steps of a method for securely providing a secret data Z from a sender to one or more receivers as can be performed by a system as described above. Optional steps are indicated by dashed lines. In optional step 5 a new function F is transmitted from the sender to the receiver. In optional step 6 the new function F replaces one or more of the functions in the memory of the receiver. In step 1 one or more seeds S and/or S* are provided from the sender to the receiver. In step 2 the receiver migrates the secret data Z from the input transform space, e.g. input transform space IN, to a final output transform space, e.g. output transform space OUT1, OUT2, OUT3 or OUT4, using the sequence of functions under control of the provided seeds. In optional step 3 a personalized seed is read from the second memory in the receiver. In optional step 4 the receiver obtains the secret data Z by migrating the secret data from the final output transform space to a clear text transform space under control of the personalized seed.

Figure 9:
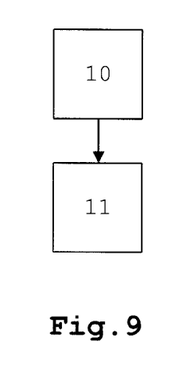
FIG. 9 shows the steps of a method in a sender of an exemplary embodiment of the invention.

FIG. 9 shows the steps of a method for securely providing a secret data Z from a sender to one or more receivers as can be performed by a sender as described above. In step 10 the sender defines a hierarchy of functions, wherein each function F is configured to migrate the secret data Z from an input transform space, e.g. input transform space IN, to an output transform space, e.g. output transform space OUT, using a mathematical transformation under control of a seed S or S*. In step 11 one or more seeds S and/or S* are provided to the receivers.

Figure 10:
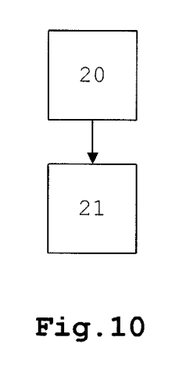
FIG. 10 shows the steps of a method in a receiver of an exemplary embodiment of the invention.

FIG. 10 shows the steps of a method for securely providing a secret data Z from a sender to one or more receivers as can be performed by a receiver as described above. In step 20 one or more seeds S and/or S* are received from the sender. In step 21 the secret data Z is migrated from the input transform space, e.g. input transform space IN, to a final output transform space, e.g. output transform space OUT1, OUT2, OUT3 or OUT4, using the sequence of functions under control of the seeds S and/or S*.

Figure 11:
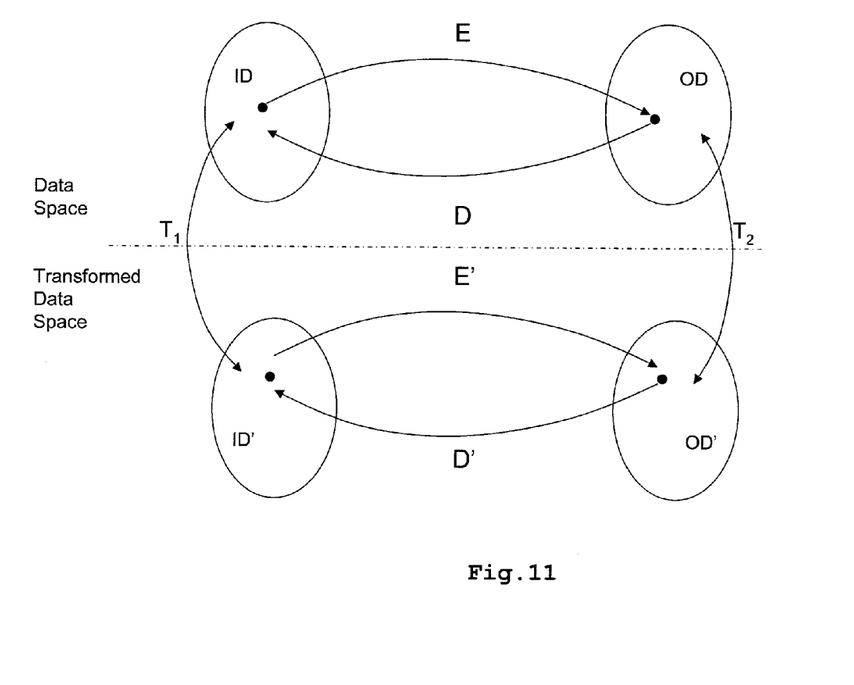
FIG. 11 shows a diagram clarifying transformation functions and encryption in general terms.

The concept of transformation functions and encryption is clarified in general with reference to FIG. 11.

Assume, there exists an input domain ID with a plurality of data elements in a non-transformed data space. An encryption function E using some key is defined that is configured to accept the data elements of input domain ID as an input to deliver a corresponding encrypted data element in an output domain OD. By applying a decryption function D, the original data elements of input domain ID can be obtained by applying the decryption function D to the data elements of output domain OD.

In a non-secure environment, an adversary is assumed to be able to control the input and output data elements and the operation of the implementation of the encryption function E, in order to discover the confidential information (such as keys) that is embedded in the implementation.

Additional security can be obtained in such a non-secured environment by applying transformation functions to the input domain ID and output domain OD, i.e. the transformation functions are input- and output operations. Transformation function T1 maps data elements from the input domain ID to transformed data elements of transformed input domain ID' of a transformed data space. Similarly, transformation function T2 maps data elements from the output domain OD to the transformed output domain OD'. Transformed encryption and decryption functions E' and D' can now be defined between ID' and OD' using transformed keys. T1 and T2 are bijections.

Using transformation functions T1, T2, together with encryption techniques implies that, instead of inputting data elements of input domain ID to encryption function E to obtain encrypted data elements of output domain OD, transformed data elements of domain ID' are input to transformed encryption function E' by applying transformation function T1. Transformed encryption function E' combines the inverse transformation functions $T1^{-1}$ and/or $T2^{-1}$ in the encryption operation to protect the confidential information, such as the key. Then transformed encrypted data elements of domain OD' are obtained. By performing T1 and/or T2 in a secured portion, keys for encryption functions E or decryption function D can neither be retrieved when analyzing input data and output data in the transformed data space nor when analyzing the white box implementation of E' and/or D'.

One of the transformation functions T1, T2 should be a non-trivial function. In case, T1 is a trivial function, the input domains ID and ID' are the same domain. In case, T2 is a trivial function, the output domains are the same domain.

What is claimed is:

1. A system for securely providing a secret data to one or more receivers, wherein the receiver comprises a first memory configured for storing a sequence of functions originating from a hierarchy of functions, for migrating the secret data from an input transform space to a final output transform space, the system comprising:
   a sender including:
      an interface for communication with one or more receivers;
      a processor configured to:
      define the hierarchy of functions such that the sequence of the functions comprises:
         a first function at a first level of the hierarchy of functions, for transformation of the secret data using a first seed,
         a second function at a second level of the hierarchy of functions, for transformation of the output of the first function using a second seed, and
         a third function at a third level of the hierarchy of functions for transformation of the output of the second function using a third seed;
      provide either one or more of the seeds including the second seed to the receiver; and change accessibility of the receiver to the secret data by updating the second seed based on the third seed of the receiver, wherein a transformation is a particular data encoding chosen to be lossless and not easily reversible.

2. The system according to claim 1, wherein each function in the sequence of functions is controlled by a unique seed and wherein the sender is configured to provide each unique seed to the receiver.

3. The system according to claim 2, wherein the sequence of functions is unique to the receiver.

4. The system according to any of the claims 1-3, wherein the receiver comprises a second memory configured for storing a personalized seed and wherein the receiver is configured to obtain the secret data by migrating the secret data from the final output transform space to a clear text transform space under control of the personalized seed.

5. The system according to claim 1, wherein each function is protected by code obfuscation.

6. The system according to claim 1, wherein the sender is configured to transmit a new function to the receiver and wherein the receiver is configured to replace in the memory one or more of the functions in the sequence of functions with the new function.

7. A receiver for securely receiving a secret data from a sender and for use in a system according to claim 1, comprising:
   a first memory configured for storing a sequence of functions originating from a hierarchy of functions, the sequence of the functions comprising:
      a first function at a first level of the hierarchy of functions, for transformation of the secret data using a first seed,
      a second function at a second level of the hierarchy of functions, for transformation of the output of the first function using a second seed, and
      a third function at a third level of the hierarchy of functions, for transformation of the output of the second function using a third seed, and
   a processor configured to:
      migrate the secret data from an input transform space to a final output transform space using the sequence of functions, and
      receive either one or more of the seeds including the second seed, from the sequence of functions being configured such that accessibility of the receiver to the secret data being changed based on a relationship between the second seed for the second function and the third seed for the third function,
   wherein a transformation is a particular data encoding chosen to be lossless and not easily reversible.

8. A method for securely providing a secret data from a sender t, one or more receivers, the receiver comprising a processor and a memory configured for storing a sequence of functions originating from a hierarchy of functions he method comprising the steps of:
   defining the hierarchy of functions such that the sequence of function comprises:
   a first function at a first level of the hierarchy of functions, for transformation of the secret data using a first seed;
   a second function at a second level of the hierarchy of functions, for transformation of the output of the first function using a second seed; and
   a third function at a third level of the hierarchy of functions, for transformation of the output of the second function using a third seed;
   providing one or more of the seeds including the second seed from the sender to the receiver to mitigate, by the processor in the receiver, the secret data from an input transform space to a final output transform space using the sequence of functions under control of the seeds; and
   changing accessibility of the receiver to the secret data, including updating the second seed based on the third seed of the receiver.

9. The method according to claim 8, wherein each function in the sequence of functions is controlled by a unique seed and wherein the method comprises the step of providing each unique seed from the sender to the receiver.

10. The method according to claim 9, wherein the sequence of functions is unique to the receiver.

11. The method according to any of the claims 8-10, further comprising the steps of reading a personalized seed from a second memory in the receiver and obtaining in the receiver the secret data by migrating the secret data from the final output transform space to a clear text transform space under control of the personalized seed.

12. The method according to claim 8, wherein each function is protected by code obfuscation.

13. The method according to claim 8, further comprising the steps of transmitting a new function from the sender to the receiver and replacing in the memory of the receiver one or more of the functions in the sequence of functions with the new function.

14. A non-transitory computer readable storage medium storing one or more programs, the one or more programs comprising instructions, which when executed by a computer device, cause the computer device to perform a method in a sender for securely providing a secret data to one or more receivers, the method comprising:
   defining a hierarchy of functions, the hierarchy of the functions forming a sequence of functions comprising:
      a first function at the first level of the hierarchy of functions, for transformation of the secret data using a first seed,
      a second function at a second level of the hierarchy of functions, for transformation of the output of the first function using a second seed; and
      a third function at a third level of the hierarchy of functions, for transformation of the output of the second function using a third seed;
   providing one or more of the seeds including the second seed to the receivers; and
   changing accessibility of the receiver to the secret data, including updating the second seed based on the third seed of the receiver,
   wherein a transformation is a particular data encoding chosen to be lossless and not easily reversible.

15. A method in a receiver for securely receiving a secret data, the receiver comprising a processor and a memory configured for storing a sequence of functions originating from a hierarchy of functions, the sequence of functions comprising:
   a first function at a first level of the hierarchy of functions, for transformation of the secret data using a first seed;
   a second function at a second level of the hierarchy of functions, for transformation of the output of the first function using a second seed; and
   a third function at a third level of the hierarchy of functions, for transformation of the output of the second function using a third seed,
   the method comprising:
      receiving one or more of the seeds including the second seed from the sender; and migrating, by the processor, the secret data from an input transform space to a final output transform space using the sequence of functions under control of the seeds; and in response to receiving a selectively provided second seed for the second function, changing accessibility to the final output transform space by updating the second seed based on the third seed of the receiver, wherein a transformation is a particular data encoding chosen to be lossless and not easily reversible.

* * * * *

UNITED STATES PATENT AND TRADEMARK OFFICE
CERTIFICATE OF CORRECTION

| | | |
|---|---|---|
| PATENT NO. | : 8,737,620 B2 | Page 1 of 1 |
| APPLICATION NO. | : 12/714179 | |
| DATED | : May 27, 2014 | |
| INVENTOR(S) | : Eisen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Eleventh Day of August, 2015

Michelle K. Lee
*Director of the United States Patent and Trademark Office*